United States Patent Office 3,002,009
Patented Sept. 26, 1961

3,002,009
1,3,5(10)-ESTRATRIEN-3,16,17-TRIOL-3-ALKENYL ETHERS
Max N. Huffman, Colorado Springs, Colo., assignor to Lasdon Foundation, Inc., Yonkers, N.Y., a corporation of Delaware
No Drawing. Filed Feb. 28, 1961, Ser. No. 92,159
6 Claims. (Cl. 260—397.5)

This invention relates to 1,3,5(10)-estratrien-3,16,17-triol-3-alkenyl ethers and to the production thereof. More particularly this invention relates to novel estratriene compounds having the following general structural formula:

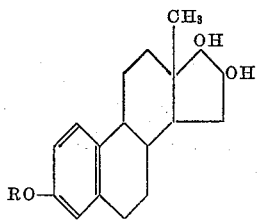

wherein R is an alkenyl radical containing 3 to 5 carbon atoms.

This application is a continuation-in-part of my co-pending application Serial No. 35,400, filed June 13, 1960, now abandoned.

The compounds of this invention are novel steroids of the estratriene series which are useful in stimulating beneficial phagocytic activity and velocity in mammals. These new steroids stimulate the removal of foreign particles in tissues by the phagocytes which are present in blood without exhibiting undesireable estrogenic properties shown by related estratriene compounds. The change in structure of the steroids of this invention from the structure of the estrogens significantly modifies the physiological properties thereof so as to remove the estrogenic activity and render the compounds useful as phagocytic stimulants. These properties are unique in the estrogen group of steroids and endow the compounds with a variety of useful physiological activities which are of value in medicinal chemistry.

It is the object of this invention to provide new steroid compounds of the 1,3,5(10)-estratriene series. It is a further object of this invention to provide methods of producing such compounds efficiently from available sources of steroids. It is another object of this invention to provide new and useful 1,3,5(10)-estratriene compounds which stimulate the phagocytic velocity in mammals. A further object of this invention is to provide new steroids of the 1,3,5(10)-estratriene series which stimulate removal of foreign particles from tissues by the phagocytes without concurrent estrogenic activity. These and other objects are apparent from and are achieved in accordance with the following description of the invention.

The 3-alkenyl ethers of 1,3,5(10)-estratrien-3,16,17-triols which comprise this invention can be produced from 1,3,5(10)-estratrien-3,16,17-triols by reaction with alkenyl halides in the presence of alkali wherein the hydroxyl radical in the 3-position is converted to an alkenyl ether and the elements of hydrogen halide are split out and neutralized by the alkali. The reaction is ordinarily carried out at a temperature in the range of 50° to 150° C. in an organic solvent such as a lower alcohol having a boiling point in the specified range. A substantial excess of alkali is used, such an anhydrous potassium carbonate, and a substantial excess of alkenyl halide is used in order to force the etherification reaction with the 3-hydroxyl group of the steroid to substantial completion. Alkenyl halides such as allyl bromide, allyl chloride, methallyl bromide, methallyl iodide, crotyl bromide and 2-pentenyl bromide are operative. At a reflux temperature of about 80° C. the etherification reaction is substantially completed in about 1 hour, although reaction times may vary from about one-half hour to several hours.

The invention is disclosed in further detail by the following examples which are provided solely for the purposes of illustration and are not intended to limit the invention in scope. Quantities of materials are indicated in grams and milligrams (mg.) and volumes are indicated in milliliters (ml.) while temperatures are recorded in degrees centigrade (° C.). It will be understood by those skilled in the art that numerous modifications in operating conditions and in equivalent materials can be made within the scope of this disclosure without departing from this invention.

EXAMPLE 1

*1,3,5(10)-estratrien-3,16β,17β-triol - 3 - allyl ether.*—A mixture of 10 grams of anhydrous potassium carbonate with a solution of 1 gram of 1,3,5(10)-estratrien-3,16β,-17β-triol in 100 ml. of 90% methanol was heated to reflux for 10 minutes. Then 3.5 ml. of allyl bromide was added and reflux continued for 15 minutes. An additional portion of 3.5 ml. of allyl bromide was added and refluxing continued for 45 minutes. The reaction mixture was diluted with 75 ml. of water and refrigerated. After standing for about 15 hours the reaction mixture was filtered to remove the precipitate of steroid and the filter cake was washed with water. The product, 1,3,5(10)-estratrien-3-16β,17β-triol-3-allyl ether, was dissolved in 75 ml. of boiling methanol and treated with 65 ml. of 0.2 N sodium hydroxide solution. The solution was cooled to room temperature and allowed to stand for at least 2 hours. The precipitate of 1,3,5(10)-estratrien-3,16β,17β-triol-3-allyl ether was collected on a filter and recrystallized again from 75 ml. of methanol containing 55 ml. of 0.2 N sodium hydroxide solution. The 1,3,5(10)-estratrien-3,16β,17β-triol-3-allyl ether thus prepared melted at 156–156.5° C.

EXAMPLE 2

*1,3,5(10)-estratrien-3,16α,17β-triol-3-allyl ether.* — A solution of 350 mg. of 1,3,5(10)-estratrien-3,16α,17β-triol in 40 ml. of 90% methanol was refluxed for 10 minutes with 3.5 grams of anhydrous potassium carbonate. Then 3.8 ml. of allyl bromide was added and refluxing continued for an hour. The reaction mixture was diluted with 30 ml. of water and allowed to cool slowly to room temperature. The mixture was placed in a refrigerator and after 15 hours the precipitate of 1,3,5(10)-estratrien-3,16α,17β-triol-3-allyl ether was removed by filtration, washed with water and dried. It was dissolved in 5 ml. of pyridine and 15 ml. of methanol, the solution was diluted with 30 ml. of water and distilled until turbidity began. The mixture was cooled to room temperature and then refrigerated for about 15 hours. The precipitate of the 1,3,5(10)-estratrien-3,16α,17β-triol-3-allyl ether was removed by filtration and dried. It was recrystallized from a mixture of 50 ml. of methanol and 75 ml. of 0.1 N sodium hydroxide solution, and finally from 50% aqueous methanol. The 1,3,5(10)-estratrien - 3,16α,17β - triol - 3 - allyl ether thus obtained melted at 144° C.

EXAMPLE 3

*1,3,5(10)-estratrien-3,16α,17α-triol-3-allyl ether.* — A solution of 65 mg. of 1,3,5(10)-estratrien-3,16α,17α-triol in 65 ml. of 90% ethanol was refluxed for 10 minutes with 6.5 grams of anhydrous potassium carbonate. Then 4.5 ml. of allyl bromide was added and refluxing continued for 1 hour after which 25 ml. of water was added and the reaction mixture evaporated until turbidity began. The reaction mixture was allowed to cool to room temperature and then refrigerated for about 15 hours. The oily precipitate of 1,3,5(10)-estratrien-3,16α,17α-triol-3-allyl ether was extracted with 250 ml. of ether. The ether extract was washed twice with 100-ml. portions of cold water and dried and evaporated on the steam bath. The residue of 1,3,5(10)-estratrien-3,16α,17α-triol-3-allyl ether was crystallized and then recrystallized from 77% methanol with the aid of activated carbon. The 1,3,5(10)-estratrien-3,16α,17α-triol-3-allyl ether melted at 130–131° C. Another crystallization raised the melting point to 133° C.

EXAMPLE 4

*1,3,5(10)-estratrien-3,16β,17α-triol-3-allyl ether.* — 200 mg. of 1,3,5(10)-estratrien-3,16β,17α-triol (prepared by the method of Fishman and Biggerstaff, J. Org. Chem., vol. 23, p. 1190 (1958)) was transferred to a flask containing 2.0 grams of anhydrous potassium carbonate. The mixture was refluxed for 15 minutes in 20 ml. of 90% methanol to assure complete solution of the steroid. Allyl bromide (0.21 ml.) was added and the mixture was refluxed and stirred for 15 minutes. A second portion of allyl bromide (0.21 ml.) was added and the mixture refluxed and stirred for 45 minutes. A solution of 5.0 grams potassium hydroxide in 10 ml. of water was added and the methanol removed by distillation under reduced pressure. The reaction mixture was cooled slightly and shaken with hexane (20 ml.) and finally cooled to 0° C. The product was filtered, washed with hexane and water and dried. After three crystallizations from aqueous methanolic alkali and one additional crystallization from hexane the 1,3,5(10)-estratrien-3,16β,17α-triol-3-allyl ether melted at 148° C.

What is claimed as new and is desired to be secured by Letters Patent of the United States is:

1. 1,3,5(10)-estratrien-3,16,17-triol - 3 - alkenyl ether, wherein the alkenyl radical contains 3 to 5 carbon atoms.
2. 1,3,5(10)-estratrien-3,16,17-triol-3-allyl ether.
3. 1,3,5(10)-estratrien-3,16β,17β-triol-3-allyl ether.
4. 1,3,5(10)-estratrien-3,16α,17β-triol-3-allyl ether.
5. 1,3,5(10)-estratrien-3,16α,17α-triol-3-allyl ether.
6. 1,3,5(10)-estratrien-3,16β,17α-triol-3-allyl ether.

No references cited.